US011400671B2

(12) United States Patent
Teunissen et al.

(10) Patent No.: US 11,400,671 B2
(45) Date of Patent: Aug. 2, 2022

(54) ASSEMBLY AND METHOD FOR PROCESSING BEAD-APEXES

(71) Applicant: VMI HOLLAND B.V., Epe (NL)

(72) Inventors: Theodorus Gijsbertus Gerardus Teunissen, Epe (NL); Peter Beekman, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/616,807

(22) PCT Filed: May 1, 2018

(86) PCT No.: PCT/NL2018/050285
§ 371 (c)(1),
(2) Date: Nov. 25, 2019

(87) PCT Pub. No.: WO2018/217078
PCT Pub. Date: Nov. 29, 2018

(65) Prior Publication Data
US 2021/0008820 A1    Jan. 14, 2021

(30) Foreign Application Priority Data

May 24, 2017   (NL) ..................................... 2018974

(51) Int. Cl.
*B29D 30/00*       (2006.01)
*B29D 30/48*       (2006.01)

(52) U.S. Cl.
CPC ......... *B29D 30/0016* (2013.01); *B29D 30/48* (2013.01); *B29D 2030/0044* (2013.01); *B29D 2030/0066* (2013.01); *B29D 2030/481* (2013.01)

(58) Field of Classification Search
CPC ........ B29D 2030/0044; B29D 30/0016; B29D 30/005; B29D 30/0061
(Continued)

(56) References Cited

U.S. PATENT DOCUMENTS 5,203,938 A    4/1993   Moody et al. ................ 156/136
5,735,995 A    4/1998   Bull et al. ............. B29D 30/48
(Continued)

FOREIGN PATENT DOCUMENTS

CN    1160631       10/1997    ............. B29D 30/16
CN    104245293     12/2014    ............. B29D 30/00
(Continued)

OTHER PUBLICATIONS

ESpaceNet Translation of JP2009286009A (Year: 2020).*
(Continued)

*Primary Examiner* — Robert C Dye
*Assistant Examiner* — Alexander D Booth
(74) *Attorney, Agent, or Firm* — Hayes Soloway P.C.

(57) ABSTRACT

An assembly for processing bead-apexes includes a weighing device for measuring the weight of one of the bead-apexes and at least one station for supplying or receiving the bead-apexes to or from the weighing device in a supply direction or a discharge direction, respectively. The assembly further includes a frame for supporting the at least one station, wherein the weighing device has a weighing member for receiving and supporting one of the bead-apexes and a base member connected to and forming a base for the weighing member. The weighing device is arranged for measuring the weight of the one bead-apex on the weighing member, while the weighing member is arranged for keeping the one bead-apex stationary during the weighing, while the frame of the assembly and the base member of the weighing device are supported independently.

26 Claims, 10 Drawing Sheets

(58) Field of Classification Search
USPC .......................................................... 156/136
See application file for complete search history.

(56) References Cited

U.S. PATENT DOCUMENTS

| | | | | |
|---|---|---|---|---|
| 6,328,835 | B1* | 12/2001 | Kobayashi | B29D 30/0016 156/111 |
| 8,955,571 | B2 | 2/2015 | Kohnen et al. | 156/406.2 |
| 9,144,946 | B2 | 9/2015 | Creasap et al. | B29D 30/10 |
| 9,701,078 | B2 | 7/2017 | Moynet et al. | B29D 30/0016 |
| 10,350,863 | B2 | 7/2019 | Landmann et al. | B32B 27/12 |
| 2007/0215265 | A1 | 9/2007 | Sata | 156/110.1 |
| 2007/0272345 | A1* | 11/2007 | Sawada | B29D 30/48 156/131 |
| 2008/0110547 | A1 | 5/2008 | Yovichin et al. | 156/64 |
| 2012/0228791 | A1 | 9/2012 | Creasap et al. | 264/40.4 |
| 2014/0053987 | A1* | 2/2014 | Lawson | B60C 25/14 157/1.28 |
| 2014/0161584 | A1 | 6/2014 | Kohnen et al. | 414/806 |
| 2017/0234677 | A1* | 8/2017 | Little | G01B 11/026 348/86 |
| 2018/0361696 | A1* | 12/2018 | D'Oria | B29D 30/50 |

FOREIGN PATENT DOCUMENTS

| | | | | |
|---|---|---|---|---|
| CN | 105346116 | | 2/2016 | ............. B29D 30/08 |
| DE | 102012103066 A1 * | | 10/2013 | ......... B29D 30/0016 |
| JP | 06-155627 | | 6/1994 | ............... B29D 3/00 |
| JP | 2005-111786 | | 4/2005 | ............. B29D 30/48 |
| JP | 2009286009 A * | | 12/2009 | ......... B29D 30/0016 |
| JP | 2013-512133 | | 4/2013 | ............. B29D 30/08 |
| JP | 2014-117955 | | 6/2014 | ............. B29D 30/32 |
| JP | 2016-215514 | | 12/2016 | ............. B29D 30/06 |
| KR | 1999-0040970 | | 6/1999 | ............... B60C 9/00 |
| KR | 10-1479569 | | 1/2015 | ............. B29D 30/08 |
| SU | 184424 | | 7/1966 | ............. B29H 17/24 |
| WO | WO2017/139541 | | 8/2017 | ............. G01B 11/08 |

OTHER PUBLICATIONS

ESpaceNet Translation of DE102012103066A (Year: 2020).*
Japanese Official Action issued in corresponding Japan Patent Appln. Serial No. 2019-564786, dated Jun. 9, 2020 (with translation), 5 pgs.
Chinese Official Action issued in corresponding Chinese Patent Appln. Serial No. 201880033286.X, dated Apr. 15, 2020 (with translation), 11 pgs.
Decision to Grant issued in corresponding Korean Patent Appln. Serial No. 10-2018-7022556, dated Jul. 30, 2019 (with translation), 6 pgs.
PCT International Search Report issued in corresponding PCT International Patent Application Serial No. PCT/NL2018/050285, filed May 1, 2018, dated Jun. 19, 2018 (5 pgs).
PCT International Written Opinion issued in corresponding PCT International Patent Application Serial No. PCT/NL2018/050285, filed May 1, 2018, dated Nov. 29, 2018 (6 pgs).
Official Action issued in corresponding Korean Patent Appln. Serial No. 10-2018-7022556, dated May 30, 2019 (in English), 3 pgs.
Written Opinion issued in corresponding Korean Patent Appln. Serial No. 10-2018-7022556, dated May 30, 2019 (in English), 5 pgs.
Russian Search Report issued in corresponding Russian Patent Appln. Serial No. 2019142498/05, dated Aug. 20, 2021 (with translation), 4 pgs.

* cited by examiner

ASSEMBLY AND METHOD FOR PROCESSING BEAD-APEXES

BACKGROUND

The invention relates to an assembly and method for processing bead-apexes.

JP 06-155627 A discloses a device, wherein a weight of a tire composing member is converted into a wave form and kind and actual weight of the tire composing member are obtained by using the wave form, so that it is not necessary to lay a measuring conveyor and the tire composing member on a weight measuring sensor in a static state. Accordingly, even when the tire composing member is passing on the measuring conveyor, weight measuring work and pass deciding work can be carried out, thereby improving work efficiency.

Although the known device improves work efficiency, the movement of the conveyor during the weighing influences the weight measurement of the bead apex, which may cause deviations in the actual measured weight.

It is an object of the present invention to provide an alternative assembly and method for processing bead-apexes.

SUMMARY OF THE INVENTION

According to a first aspect, the invention provides an assembly for processing bead-apexes, wherein the assembly comprises a weighing device for measuring the weight of one of the bead-apexes and a supply station at a supply position for supplying the bead-apexes to the weighing device in a supply direction, wherein the assembly further comprises a frame for supporting the at least one station, wherein the weighing device comprises a weighing member with a weighing surface for receiving and supporting one of the bead-apexes in a horizontal or substantially horizontal weighing plane and a base member connected to and forming a base for the weighing member, wherein the weighing device is arranged for measuring the weight of the one bead-apex in a weighing position on the weighing member, wherein the supply station defines a supply plane parallel or substantially parallel to the weighing plane, wherein the weighing plane is arranged to be in line or substantially in line with the supply plane when supplying the one bead-apex to the weighing device, wherein the weighing member is arranged for keeping the one bead-apex stationary during the weighing, and wherein the frame of the assembly and the base member of the weighing device are supported independently.

When the weighing plane and the supply plane are in line, the one bead-apex can be transferred more easily, e.g. by simply moving said one bead-apex in the supply direction from one plane onto the other. More in particular, the one bead-apex can be supplied from the supply plane to the weighing plane in substantially the same orientation. Consequently, the weighing can be performed in-line, i.e. by directly transferring the one bead-apex from the supply station onto the weighing device in the supply direction. Because the one bead-apex is kept stationary during the weighing the weighing can be more accurate. Furthermore, because the weighing device is supported independently, negative influences of the rest of the assembly on the weighing accuracy, e.g. vibrations, can be reduced. More in particular, the bead-apex can be stabilized for weighing more quickly.

In a further embodiment the assembly further comprises a first transport device for transporting the one bead-apex from the supply station to the weighing device. Thus, the transport may be performed mechanically rather than manually, thereby improving the accuracy of the positioning.

In a preferred embodiment thereof, the first transport device is arranged for picking and placing, dragging, pulling or pushing the one bead-apex from the supply position to the weighing position. These modes of transport allow for the one bead-apex to be transferred onto the weighing plane and to subsequently release said bead-apex from the first transport device to stabilize it in a stationary position on the weighing plane.

In a preferred embodiment, the first transport device is arranged for releasing the one bead-apex in the weighing position. By releasing the one bead-apex, the one bead-apex may be stabilized in a stationary position on the weighing plane prior to the weighing. The release can prevent that the first transport device influences the weighing.

In a further embodiment the assembly further comprises one or more follow-up stations at one or more follow-up positions for receiving the one bead-apex from the weighing device. The follow-up stations can receive the one-bead apex from the weighing device for follow-up operations, depending on the measured weight, e.g. storage, waste, lab analysis or transport to a downstream tire-building station. In accordance with the first aspect of the invention, the weighing device can be supported independently from the supply station and/or said one or more follow-up stations.

In a further embodiment, the one or more follow-up positions comprise a first follow-up position and wherein the one or more follow-up stations comprise a pile-up station at said first follow-up position, wherein the pile-up station comprises a pile-up member for receiving and stacking a plurality of the bead-apexes in a pile-up direction. By piling-up the bead-apexes, they can be stacked effectively and/or efficiently. In accordance with the first aspect of the invention, the weighing device can be supported independently from the pile-up station.

In a preferred embodiment thereof, the pile-up station is arranged for receiving the one bead-apex from the weighing device in a pile-up plane, wherein the pile-up plane is parallel or substantially parallel to the weighing plane. Hence, the one bead-apex can be supplied from the weighing plane to the pile-up plane in substantially the same orientation.

In a preferred embodiment, the pile-up plane is arranged to be in line or substantially in line with the weighing plane when receiving the one bead-apex from the weighing device. When the weighing plane and the pile-up plane are in line, the one bead-apex can be transferred more easily, e.g. by simply moving said one bead-apex in the supply direction from one plane onto the other.

In a further embodiment, the one or more follow-up positions comprise a second follow-up position and wherein the one or more follow-up stations comprise a conveyance station at said second follow-up position, wherein the conveyance station comprises a transport conveyor for conveying the bead-apex in a conveyance direction. The transport conveyor can be used to transport the bead-apex directly to a downstream station, e.g. a tire building station. In accordance with the first aspect of the invention, the weighing device can be supported independently from the conveyance station.

In a preferred embodiment thereof, the conveyance station is arranged for receiving the one bead-apex from the weighing device in a conveyance plane, wherein the weighing plane is parallel or substantially parallel to the conveyance plane. Hence, the one bead-apex can be supplied from the weighing plane to the conveyance plane in substantially the same orientation.

In a preferred embodiment, the weighing plane is arranged to be in line or substantially in line with the conveyance plane when receiving the one bead-apex from the weighing device. When the weighing plane and the conveyance plane are in line, the one bead-apex can be transferred more easily, e.g. by simply moving said one bead-apex in the supply direction from one plane onto the other.

In a further embodiment, each bead-apex comprises a circular or substantially circular bead and a filler apex extending radially outward from said bead, wherein the bead has an inner rim extending in a bead-apex plane and forming a circular opening, wherein the one or more follow-up positions comprise a third follow-up position and wherein the one or more follow-up stations comprise a storage station at said third follow-up position, wherein the storage station comprises one or more storage members for storing one or more of the bead-apexes in a vertical orientation in which the one or more bead-apexes are supported with their respective rims on the one or more storage members and the bead-apex planes are vertical or substantially vertical.

In a preferred embodiment thereof, the storage station is arranged for receiving the one bead-apex from the weighing device in a storage plane, wherein the weighing plane is parallel or substantially parallel to the storage plane. Hence, the one bead-apex can be supplied from the weighing plane to the storage plane in substantially the same orientation.

In a preferred embodiment, the weighing plane is arranged to be in line or substantially in line with the storage plane when receiving the one bead-apex from the weighing device. When the weighing plane and the storage plane are in line, the one bead-apex can be transferred more easily, e.g. by simply moving said one bead-apex in the supply direction from one plane onto the other.

The storage station can also be used for inspecting a bead apex.

In a further embodiment, the storage station is a storage carousel comprising a central member which is rotatable about a central axis, wherein the one or more storage members comprise two or more storage arms extending radially from said central axis for storing the one or more of the bead-apexes in the vertical orientation. The one or more storage arms of the storage carrousel can effective store a large amount of bead-apexes on a relatively small footprint. The storage carousel can be rotated around its central axis to line up its arms with the weighing device or a further processing device for further processing the bead-apexes.

In a preferred embodiment thereof, each storage arm comprises a storage conveyor for conveying the bead-apexes stored thereon radially inward and radially outward along the respective storage member with respect to the central axis. Hence, the bead-apexes can temporarily be stored on a first one of the arms of the carousel being lined up with the weighing device.

In a preferred embodiment thereof, the weighing member and the one or more follow-up stations are movable relative to each other. The movability can facilitate interaction between the weighing member, the supply station and the one or more of the follow-up stations.

In a preferred embodiment thereof, the weighing member is movable relative to the base member in an alignment direction from a first transfer position in alignment with the supply position into a second and/or further transfer positions in alignment with any one of the one or more follow-up positions. The relative movement between the weighing member and the follow-up stations can facilitate receiving the one bead-apex from the supply position in one transfer position while transporting the one bead-apex from the weighing member to said one follow-up station in another transfer position.

In a preferred embodiment, the weighing device comprises a weighing drive for driving the movement of the weighing member in the alignment direction. Hence, the weighing member can be moved mechanically rather than manually.

In a preferred embodiment, the alignment direction is transverse, perpendicular or substantially perpendicular to the weighing plane. When the weighing plane is horizontal or substantially horizontally, the weighing member can effectively be raised or lowered in the alignment direction while keeping the one bead-apex stationary on the weighing surface.

In a further embodiment thereof, the one bead-apex comprises a circular or substantially circular bead and a filler apex extending radially outward from said bead, wherein the bead has an inner rim extending in a bead-apex plane and forming a circular opening, wherein the weighing member has a circumferential edge facing one of the two or more follow-up stations, wherein the weighing surface is arranged for receiving and supporting the one bead-apex in the weighing position such that a part of the one bead-apex protrudes from the weighing surface towards the one follow-up station and a part of the circular opening of the bead-apex is extending beyond the edge of the weighing member, wherein the rim at the part of the circular opening that extends beyond the edge of the bead and the edge of the weighing member are facing each other at a gap distance, wherein the one follow-up station is arranged for engaging the protruding part of the one bead-apex from its respective position, and wherein the weighing member and the one follow-up station are arranged for causing the one bead-apex to pivot around the rim of the bead when the weighing member and the one follow-up station are moved relative to each other in the alignment direction and the rim of the bead is supported on the one follow-up station. By placing the one bead-apex in the weighing position such that a part of the one bead-apex protrudes from the weighing surface, transferring of the one bead-apex from the weighing member to the one follow-up station can be achieved by a relative movement between the weighing member and the one follow-up station. No additional transport devices are required for said transfer. Although the protruding part of the one bead-apex protrudes from the weighing surface, the one bead-apex is solely supported by the weighing surface during the weighing and an accurate weight measurement can be performed.

In a preferred embodiment, the weighing member is arranged for dropping away from the one bead-apex, thereby allowing the one bead-apex to pivot about its support on the one follow-up station into a vertical orientation in which the one bead-apex is supported with its respective rim on the one follow-up station and the bead-apex plane is vertical or substantially vertical. Because the weighing member is arranged for dropping away from the one bead-apex, no additional transport devices are required for transferring the one bead-apex from the weighing member to the one follow-up station.

In a preferred embodiment, the assembly further comprises a first transport device and a control unit, wherein the control unit is arranged for controlling the first transport device to place the one bead-apex in the weighing position such that the part of the one bead-apex protrudes from the weighing surface towards the one follow-up station. The control unit can automate the transfer of the one bead-apex from the weighing member to the one follow-up station. By controlling the first transport device, the control unit can ensure accurate placement of the one bead-apex in the weighing position.

In a further embodiment, the one or more follow-up stations comprise two or more follow-up stations at two or more follow-up positions for receiving the one of the bead-apexes from the weighing device. Based on the weight of the bead-apex, one of two or more follow-up stations can be selected for receiving the one bead-apex, wherein the weighing member is movable relative to the base member in the alignment direction from the first transfer position in alignment with the supply position into a second transfer position and a third transfer position in alignment with a first one of the two or more follow-up station and a second one of the two or more follow-up stations, respectively.

In an alternative embodiment, the assembly further comprises one or more further transport devices for transporting the one bead-apex from the weighing position to one of the one or more follow-up positions. The one or more further transport devices can be used to facilitate and/or aid the transfer of the one bead-apex to the follow-up stations in the one or more follow-up positions.

In a preferred embodiment thereof, the one or more further transport devices are arranged for picking and placing, dragging, pulling or pushing the one of the bead-apexes from the weighing position to the one of the one or more follow-up positions. These modes of transport can be effectively used for picking up the one bead-apex that has previously been release by the first transport device on the weighing surface.

In a further embodiment, the assembly further comprises a control unit which is operationally connected to the weighing member for receiving a signal indicative of the measured weight of the one bead-apex, wherein the control unit is arranged for controlling the movement of the one bead-apex to one of the one or more follow-up stations based on the weight of the one bead-apex. The control unit can select a follow-up station based on the weight of the bead apex. Preferably, the control unit can control the weighing drive and/or the transport devices, for transferring the one bead-apex from the weighing device to a desired follow-up station.

According to a second aspect, the invention provides a method for processing a bead-apex, wherein the method comprises the steps of providing an assembly for processing bead-apexes, wherein the assembly comprises a weighing device for measuring the weight of one of the bead-apexes and a supply station at a supply position for supplying the bead-apexes to the weighing device in a supply direction, wherein the assembly further comprises a frame for supporting the supply station, wherein the weighing device comprises a weighing member for receiving and supporting the one bead-apex and a base member connected to and forming a base for the weighing member, wherein the weighing member comprises a weighing surface for supporting the one bead-apex in a horizontal or substantially horizontal weighing plane, wherein the supply station defines a supply plane parallel or substantially parallel to the weighing plane, wherein the weighing device is arranged for measuring the weight of the one bead-apex in a weighing position on the weighing member, wherein the weighing member is arranged for keeping the one bead-apex stationary during the weighing, and wherein the frame of the assembly and the base member of the weighing device are supported independently, wherein the method further comprises the steps of:
  a) transporting the one bead-apex from the supply position to the weighing position, wherein the weighing plane is arranged to be in line or substantially in line with the supply plane when supplying the one bead-apex to the weighing device;
  b) measuring the weight of the one bead-apex while stationary.

When the weighing plane and the supply plane are in line, the one bead-apex can be transferred more easily, e.g. by simply moving said one bead-apex in the supply direction from one plane onto the other. More in particular, the one bead-apex can be supplied from the supply plane to the weighing plane in substantially the same orientation. Consequently, the weighing can be performed in-line. Because the one bead-apex is kept stationary during the weighing the weighing can be more accurate. Furthermore, because the weighing device is supported independently, negative influences of the rest of the assembly on the weighing accuracy, e.g. vibrations, can be reduced.

In a preferred embodiment thereof, the method further comprises the step of stabilizing the weighing member prior to step b). Stabilizing the weighing member can eliminate vibrations caused by transferring the one bead-apex to the weighing member and can thereby improve the accuracy of the weighing.

In a preferred embodiment, the assembly further comprises one or more follow-up stations at one or more follow-up positions for receiving the one bead-apex from the weighing device, wherein the method further comprises the steps of:
  c) determining the follow-up station based on the weight of the one bead-apex;
  d) transporting the one bead-apex from the weighing position to one of the one or more follow-up positions. The follow-up stations can receive the one-bead apex from the weighing device for storage or further processing.

In a preferred embodiment, the weighing member and the one or more follow-up stations are movable relative to each other, wherein the method comprises the step of moving the weighing member and one of the one or more follow-up stations into alignment with each other prior to step d). Based on the weight of the bead-apex, one of the two or more follow-up stations can be selected for receiving the one bead-apex. The relative movement between the weighing member and the follow-up stations can facilitate transporting the one bead-apex from the weighing member to a selected follow-up station.

In a further embodiment, the weighing member is movable relative to the base member in an alignment direction transverse, perpendicular or substantially perpendicular to the weighing plane from a first transfer position in alignment with the supply position into a second and/or further transfer positions in alignment with any one of the one or more follow-up positions. The weighing member can thus effectively be raised or lowered in the alignment direction while keeping the one bead-apex stationary on the weighing surface.

In a preferred embodiment, the one bead-apex comprises a circular or substantially circular bead and a filler apex extending radially outward from said bead, wherein the bead has an inner rim extending in a bead-apex plane and forming a circular opening, wherein the weighing member has a circumferential edge facing one of the one or more follow-up stations, wherein, in step a), the one bead-apex is transported to the weighing plane such that a part of the one bead-apex protrudes from the weighing surface towards the one follow-up station and a part of the circular opening of the bead-apex is extending beyond the edge of the weighing member, wherein the rim of the bead at the part of the circular opening that extends beyond the edge and the edge of the weighing member are facing each other at a gap distance, and wherein step d) comprises the steps of:

moving the weighing member and the one follow-up station into alignment with each other, wherein the rim of the one bead-apex is supported on the follow-up station;

moving the weighing member relative to the one follow-up station in the alignment direction, causing the one bead-apex to pivot around the support of its rim on the one follow-up station;

moving the weighing member further in the alignment direction relative to the one follow-up station, causing the one bead-apex to be solely supported by the one follow-up station.

By placing the one bead-apex in the weighing position such that a part of the one bead-apex protrudes from the weighing surface, transferring of the one bead-apex from the weighing member to the one follow-up station can be achieved by a relative movement between the weighing member and the one follow-up station. No additional transport devices are required for said transfer. Although the protruding part of the one bead-apex protrudes from the weighing surface, the one bead-apex is solely supported by the weighing surface during the weighing and an accurate weight measurement can be performed.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-4 show an assembly 1 for processing bead-apexes 9 according to an exemplary embodiment of the invention. The bead-apexes 9 comprise a circular or substantially circular bead or bead core 91 and a filler, apex, apex filler or filler apex 92 extending radially outward from said bead 91. The bead 91 has an inner rim 93 extending in a bead-apex plane P9 and forming a circular opening 94.

The assembly 1 comprises a weighing device 2 for measuring the weight of one of the bead-apexes 9 and at least one station 3, 4, 5, 6, 7 for supplying or receiving the bead-apexes 9 one by one to or from the weighing device 2 in a supply direction S or a discharge direction, respectively. The assembly 1 further comprises a frame 10 for supporting the at least one station 3, 4, 5, 6, 7. Preferably, the assembly 1 comprises a supply station 3 at a supply position for supplying the bead-apexes 9 to the weighing device 2 in the supply direction S. More preferably, the assembly 1 further comprises one or more follow-up stations 4, 5, 6, 7 at one or more follow-up positions for receiving the one bead-apex 9 from the weighing device 2.

As can best be seen in FIGS. 1-4, in this exemplary embodiment, the assembly 1 comprises one supply station 3 at the supply position and four follow-up stations 4, 5, 6, 7 at four follow-up positions. The frame 10 is arranged for supporting both the supply station 3 and the follow-up stations 4, 5, 6, 7 and is placed on a horizontal or substantially horizontal ground plane P1.

The weighing device 2 comprises a weighing member 21 for receiving and supporting the one bead-apex 9 and a base member 20 connected to and forming a base for the weighing member 21. The weighing device 2 is arranged for measuring the weight of the one bead apex 9 in a weighing position on the weighing member 21. Preferably, the weighing member 21 comprises a weighing surface 22 for supporting the one bead-apex 9 in a horizontal or substantially horizontal weighing plane P2. The weighing member further comprises a circumferential edge 24. Preferably, the weighing plane P2 is parallel or substantially parallel to the ground plane P1. The weighing member 21 is arranged for keeping the one bead-apex 9 stationary during the weighing. Preferably, the weighing member 21 is arranged for keeping the one bead-apex 9 stationary in at least the supply direction S. More preferably, the weighing member 21 is arranged for keeping the one bead-apex stationary in at least the weighing plane P2. Most preferably, the weighing device 2 is arranged for stabilizing the weighing member 21 prior to weighing the one bead apex 9.

The frame 10 of the assembly 1 and the base member 20 of the weighing device 2 are supported independently i.e. the frame 10 and the base member 20 are placed separately on the ground plane P1.

In this exemplary embodiment, the weighing member 21 and the stations 3, 4, 5, 6, 7 are movable relative to each other. In particular, the weighing member 21 is movable relative to the base member 20 in an alignment direction A from a first transfer position X3 in alignment with the supply position into a second and/or further transfer positions X4, X5, X6, X7 in alignment with any of the two or more follow-up positions. Preferably, the alignment direction A is transverse to the weighing plane P2. More preferably, the alignment direction A is perpendicular or substantially perpendicular to the weighing plane P2. Preferably, the weighing member is only moved in the alignment direction A when not weighing. The weighing device 2 comprises a weighing drive 23 for driving the movement of the weighing member 21 in the alignment direction A. The weighing drive 23 could for example be a spindle drive or a pneumatic cylinder.

Figure 1:
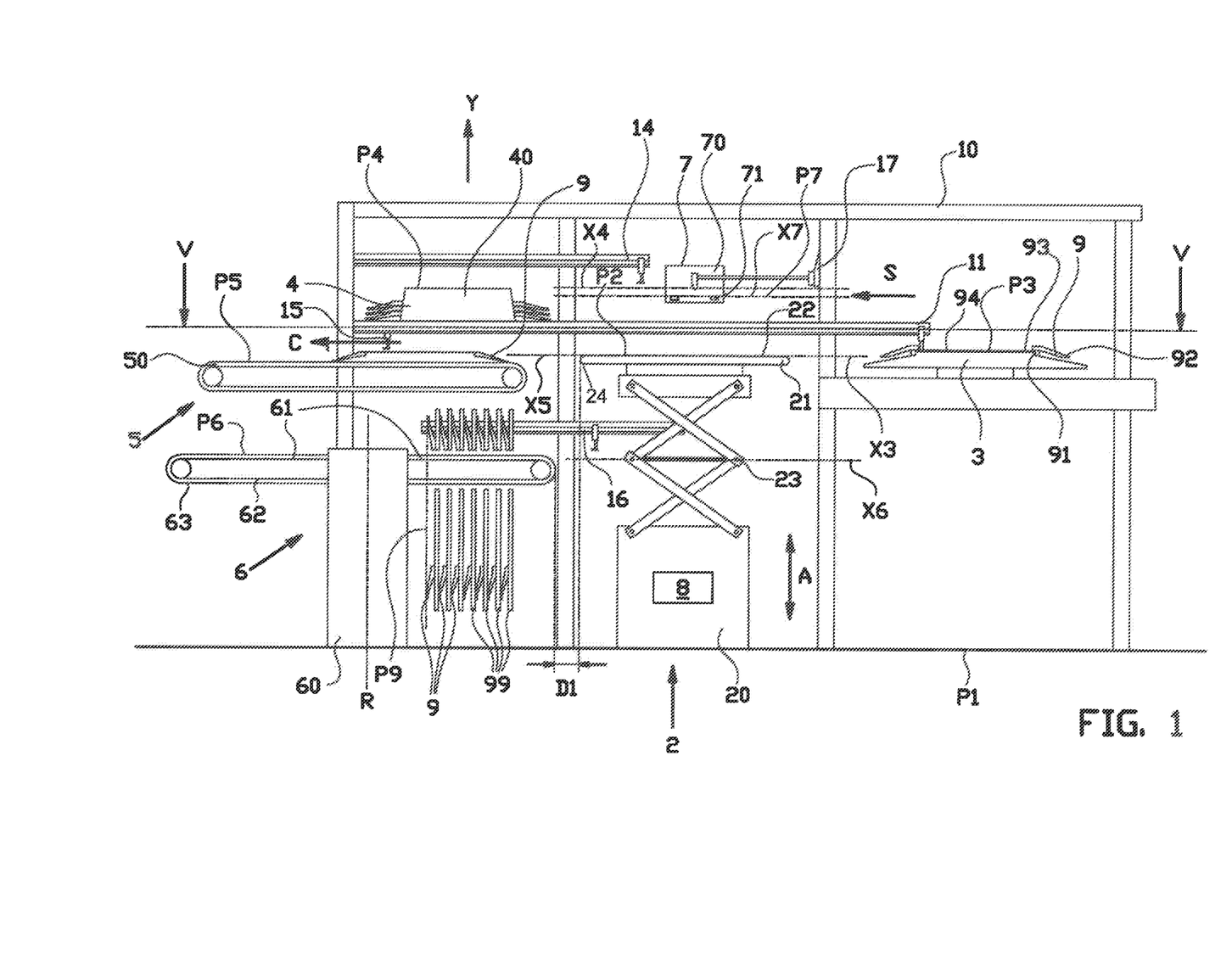
FIGS. 1-4 show front views of an assembly for processing bead-apexes during exemplary steps of a method for processing bead-apexes according to an exemplary embodiment of the invention.

As can best be seen in FIG. 1, the weighing member 21 is movable into the first transfer position X3 for transferring the one bead-apex 9 from the supply position to the weighing position. The supply station 3 defines a supply plane P3. The supply plane P3 is parallel or substantially parallel to the weighing plane P2. In the first transfer position X3, the supply plane P3 is in line or substantially in line with the weighing plane P2. The supply station 3 could for example be an assembling device for assembling bead-apexes 9 or a repository or storage for temporarily storing the bead-apexes 9.

The assembly 1 further comprises a first transport device 11 for transporting the one bead-apex 9 from the supply position to the weighing position. Preferably, the first transport device 11 is arranged for picking and placing, dragging, pulling or pushing the one bead-apex 9 from the supply position onto the stationary weighing surface 22 at the weighing position. The first transport device 11 is further arranged for releasing the one bead-apex 9 in the weighing position, after which the bead-apex 9 is left stationary. In this exemplary embodiment, the first transport device 11 is a hook. Preferably, the first transport device 11 is a linearly movable hook. Alternatively, the first transport device 11 could for example be a pick-and-place unit such as a robotic arm or any other suitable transport means.

In this exemplary embodiment, the assembly 1 further comprises further transport devices 14, 15, 16, 17 for transporting the one bead-apex 9 from the weighing position to one of the one or more follow-up positions. The one or more further transport devices 14, 15, 16, 17 are arranged for picking and placing, dragging, pulling or pushing the one of the bead-apexes from the weighing position to a respective one of the one or more follow-up positions. The further transport devices 14, 15, 16, 17 are further arranged for releasing the one bead-apex 9 in the respective one of the one or more follow-up positions.

The one or more follow-up positions comprise a first follow-up position and the one or more follow-up stations 4, 5, 6, 7 comprise a pile-up station 4 at said first follow-up position. The pile-up station 4 comprises a pile-up member 40 for receiving a plurality of the bead-apexes 9 thereon and for stacking said plurality of bead-apexes 9 one onto the other in a pile-up direction Y. As can best be seen in FIG. 2, the weighing member 21 is movable into the second transfer position X4 in alignment with the first follow-up position for transferring the one bead-apex 9 from the weighing position to the pile-up station 4 at the first follow-up position. The pile-up station 4 is arranged for receiving the one bead-apex 9 from the weighing device 2 in a pile-up plane P4. The pile-up plane is located above the bead-apexes 9 stacked on the pile-up member 40. The pile-up plane P4 is parallel or substantially parallel to the weighing plane P2. In the second transfer position X4, the weighing plane P2 is in line or substantially in line with the pile-up plane P4.

Figure 2:
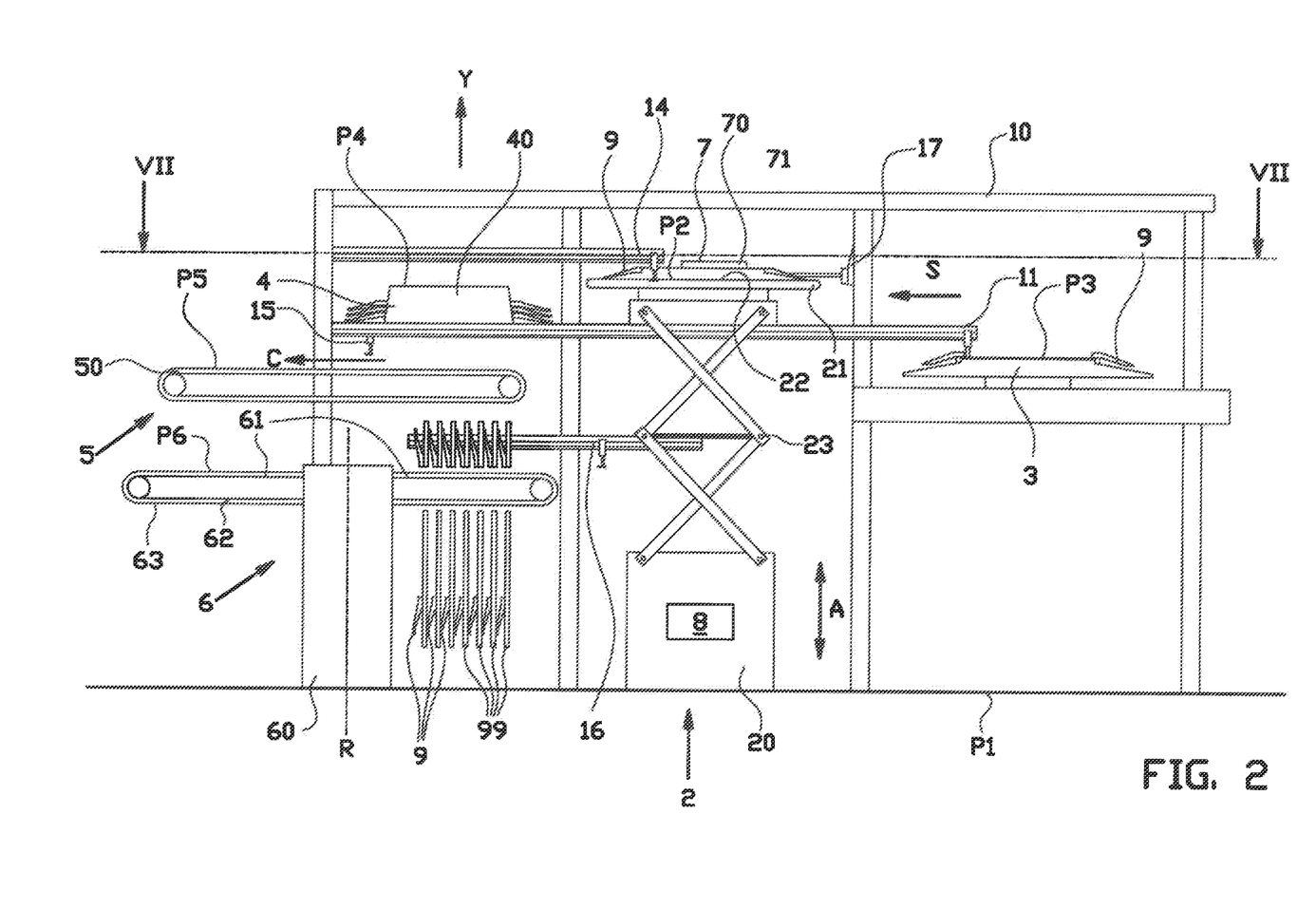
Figure 7:
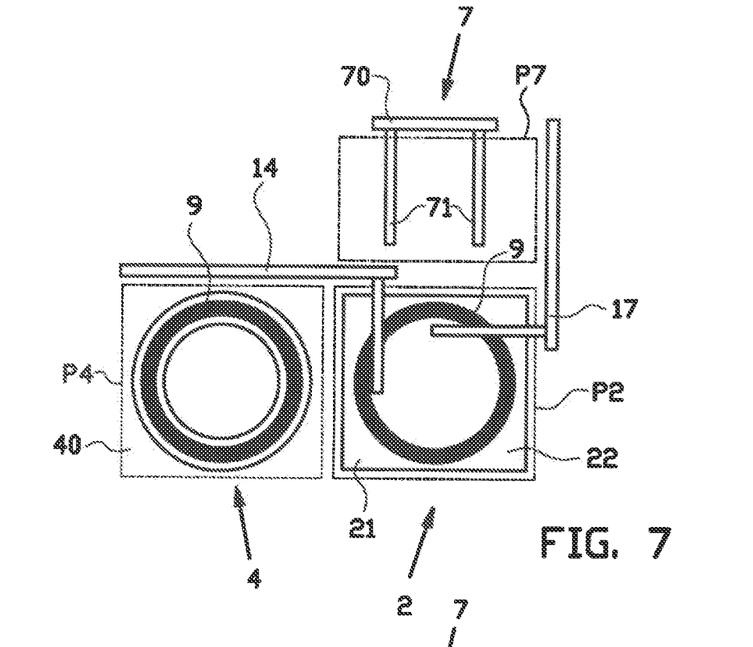
FIGS. 7 and 8 show top views at the level of the line VII-VII in FIG. 2 during exemplary steps of a method for processing bead-apexes.
Figure 8:
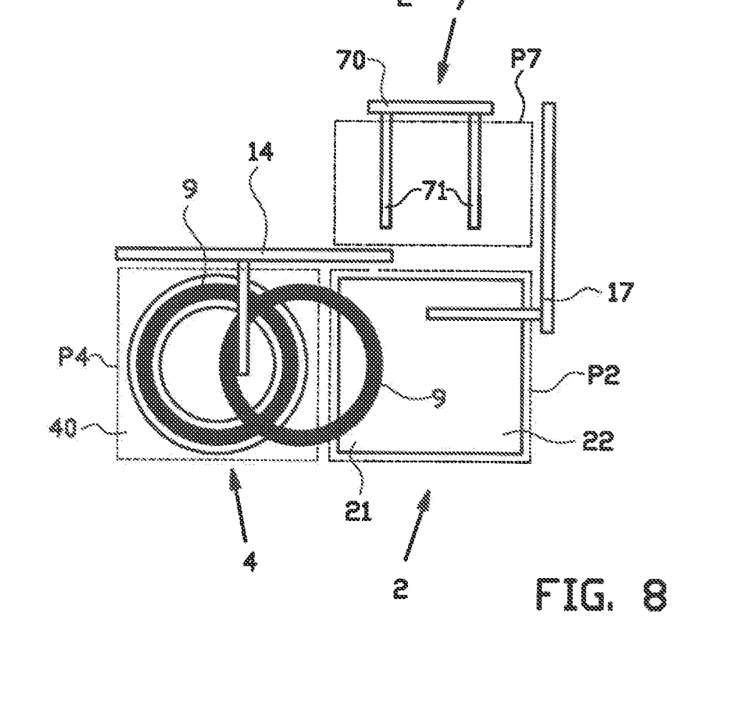

As can further be seen in FIGS. 2, 7 and 8, the assembly 1 comprises a second transport device 14 for transporting the one bead-apex 9 from the weighing position to the first follow-up position. In this exemplary embodiment, the second transport device 14 is a hook, preferably a linearly movable hook, for dragging or pulling the one bead-apex from the weighing position to the first follow-up position in the pile-up plane P4. The second transport device 14 is arranged for releasing the one bead-apex 9 above the pile-up member 40 and/or the bead-apexes 9 stacked on the pile-up member 40 to drop the one bead-apex 9 onto the pile-up member 40 or said stacked bead-apexes 9 for stacking a plurality of bead-apexes 9 in the pile-up direction Y.

The one or more follow-up positions comprise a second follow-up position and the one or more follow-up stations 4, 5, 6, 7 comprise a conveyance station 5 at said second follow-up position. The conveyance station 5 comprises a transport conveyor 50 for conveying the one bead-apex 9 in a conveyance direction C. As can best be seen in FIG. 1, the weighing member 21 is movable into a third transfer position X5 in alignment with the second follow-up position for transferring the one bead-apex 9 from the weighing position to the conveyance station 5 at the second follow-up position. The conveyance station 5 is arranged for receiving the one bead apex 9 from the weighing device 2 in a conveyance plane P5. The conveyance plane P5 is parallel or substantially parallel to the weighing plane P2. In the third transfer position X5, the weighing plane P2 is in line or substantially in line with the conveyance plane P5.

Figure 5:
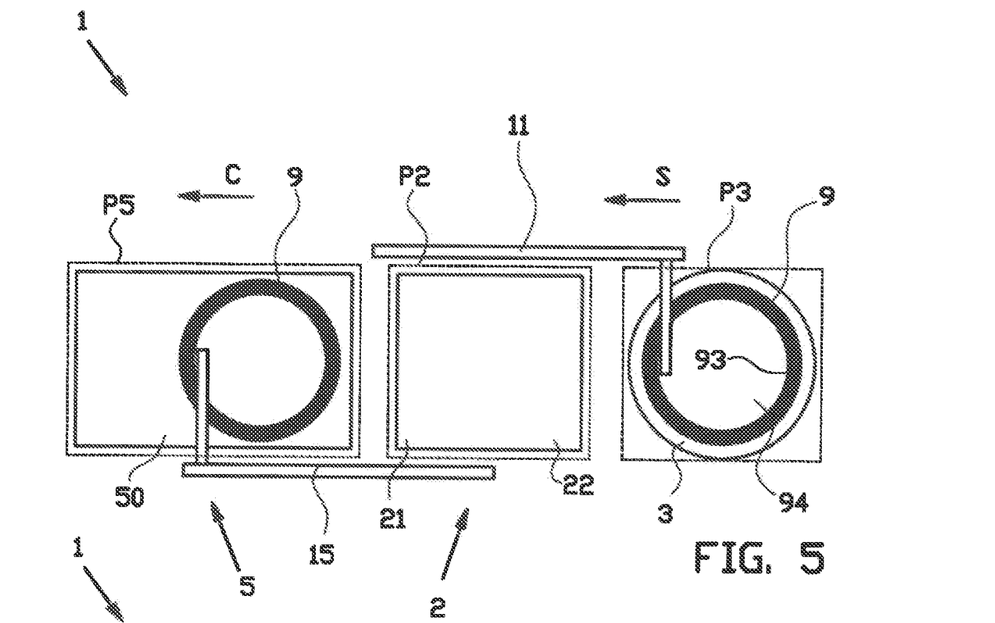
FIGS. 5 and 6 show top views at the level of the line V-V in FIG. 1 during exemplary steps of a method for processing bead-apexes.
Figure 6:
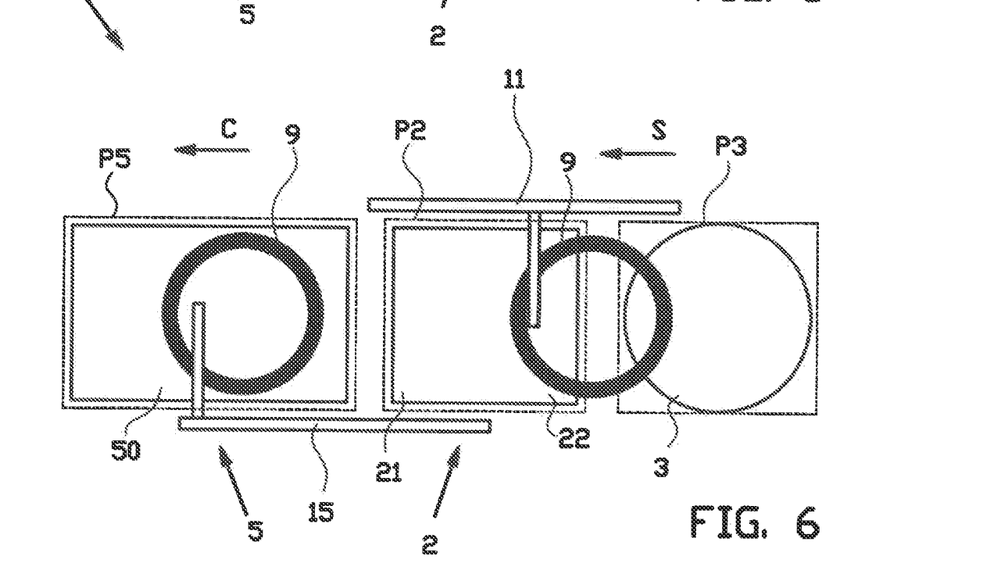

As can further be seen in FIGS. 1, 5 and 6, in this exemplary embodiment, the third transfer position X5 is equal to the first transfer position X3. The assembly comprises a third transport device 15 for transporting the one bead-apex 9 from the weighing position to the second follow-up position. In this exemplary embodiment, the third transport device 15 is a hook, preferably a linearly movable hook, for dragging or pulling the one bead-apex from the weighing position to the second follow-up position in the conveyance plane P5. The third transport device 15 is arranged for releasing the one bead-apex 9 on the transport conveyor 50. Alternatively, the functions of the first transport device 11 and the third transport device 15 can be combined in the first transport device 11 which is then arranged for transporting the one bead-apex 9 from the weighing position up to the second follow-up position. The first transport device 11 is arranged for dragging or pulling the one bead-apex from the weighing position to the second follow-up position in the conveyance plane P5.

The one or more follow-up positions comprise a third follow-up position and the one or more follow-up stations 4, 5, 6, 7 comprise a first storage station 6 at said third follow-up position. The first storage station 6 comprises one or more first storage members 61 for storing one or more of the bead-apexes 9 in a vertical orientation. As can best be seen in FIG. 4, in said vertical orientation, the one or more bead-apexes 9 are supported with their respective rims 93 on the one or more first storage members 61 and the bead-apex planes P9 are vertical or substantially vertical. Preferably, the one or more bead-apexes 9 stored on the one or more first storage members 61 are separated by separator sheets 99. An additional separator sheet 99 supply unit (not shown) may be added to the assembly for supplying said separator sheets 99 to the one or more first storage members 61.

Figure 4:
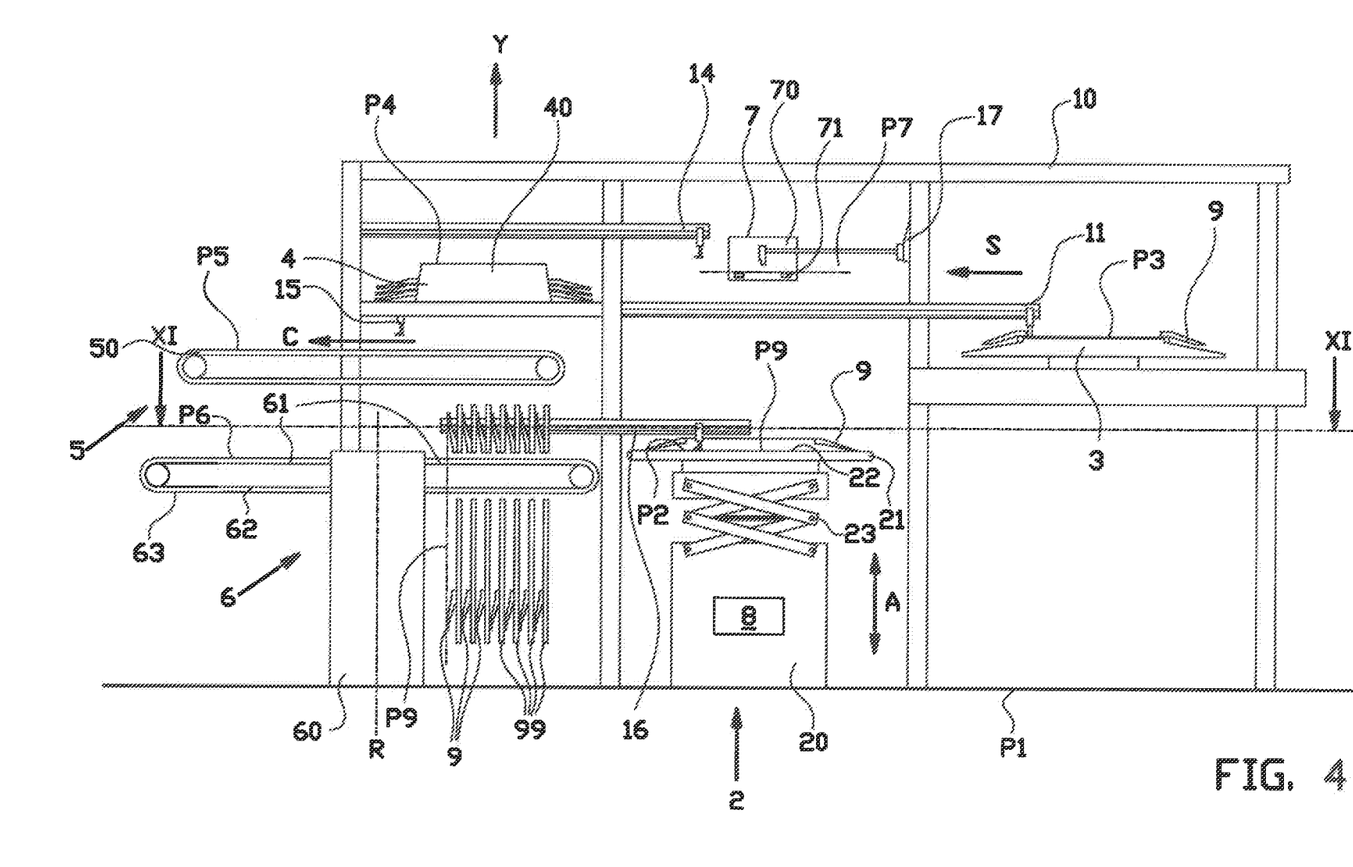

As can further be seen in FIG. 4, the weighing member 21 is movable into a fourth transfer position X6 in alignment with the third follow-up position for transferring the one bead-apex 9 from the weighing position to the first storage station 6 at the third follow-up position. The first storage station 6 is arranged for receiving the one bead-apex 9 from the weighing device 2 in a first storage plane P6. The weighing plane P2 is parallel or substantially parallel to the first storage plane P6. In the fourth transfer position X6, the first storage plane P6 is in line with, substantially in line with or located below the weighing plane P2.

Figure 11:
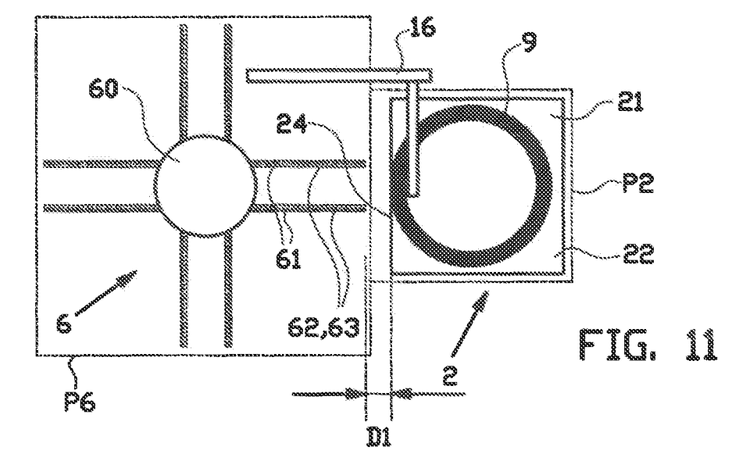
FIGS. 11 and 12 show top views at the level of the line XI-XI in FIG. 4 during exemplary steps of a method for processing bead-apexes.
Figure 12:
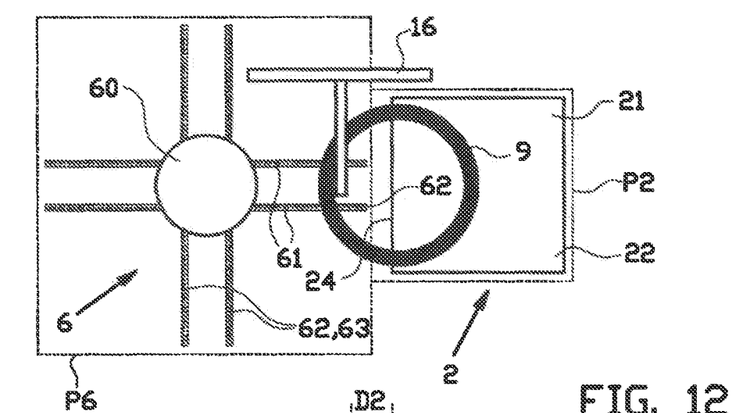

As can best be seen in FIGS. 11 and 12, in this exemplary embodiment, the first storage station 6 is a storage carousel 6 comprising a central member 60 which is rotatable about a central axis R. Preferably, the central axis R is vertical or substantially vertical. The one or more first storage members 61 comprise two or more storage arms 62 extending radially from said central axis R for storing the one or more of the bead-apexes 9 in the vertical orientation. Preferably, each storage arm 62 comprises a storage conveyor 63 for conveying the bead-apexes 9 stored thereon radially inward and radially outward along the respective storage member 61 with respect to the central axis R. The circumferential edge 24 of the weighing member 21 and the first storage station 6 are spaced apart by a mutual distance D1 to facilitate pivoting of the one bead-apex 9 into the vertical orientation as soon as the one bead-apex 9 is no longer supported by the weighing member 21.

As can further be seen in FIGS. 4, 11 and 12, one of the further transport devices 16 is arranged for transporting the one bead-apex 9 from the weighing position to the third follow-up position. The second transport device 16 is arranged for dragging or pulling the one bead-apex from the weighing position to the second follow-up position in the storage plane P6.

The one or more follow-up positions comprise a fourth follow-up position and the one or more follow-up stations 4, 5, 6, 7 comprise a second storage station 7 at said fourth follow-up position. The second storage station 7 comprises one or more first storage members 71 for storing one or more of the bead-apexes 9 in the vertical orientation. In this exemplary embodiment, the second storage station 7 comprises a central member 70 and two parallel storage members 71. The bead-apexes 9 stored on the second storage station 7 can be removed from the second storage station 7 manually or automatically for inspection. Preferably, the second storage station 7 is arranged at the front or the back of the assembly 1 to facilitate manual removal of the bead-apexes stored on the second storage station 7.

Figure 3:
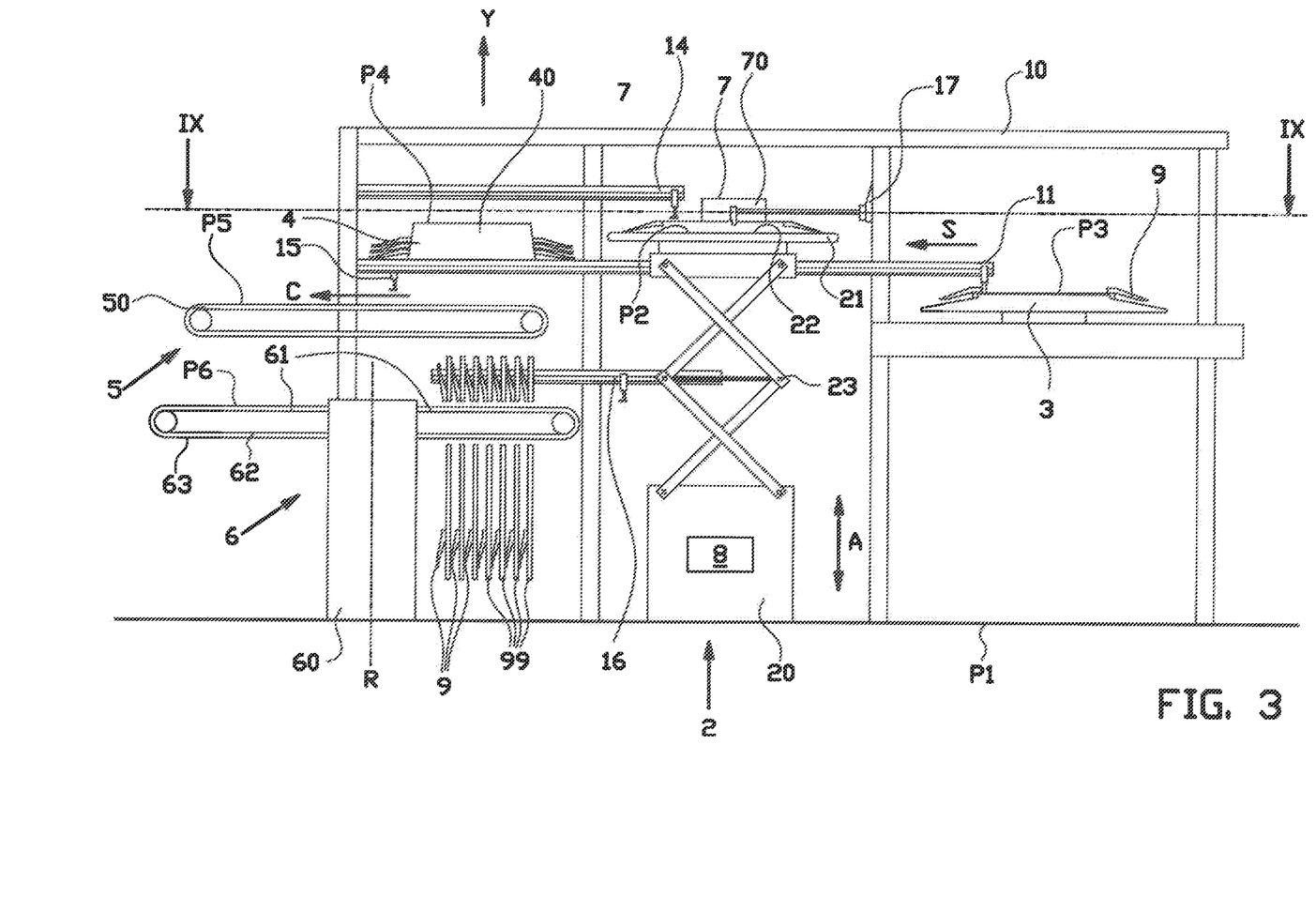

As can be seen in FIG. 3, the weighing member is movable into a fifth transfer position X7 in alignment with the fourth follow-up position for transferring the one bead-apex 9 from the weighing position to the second storage station 7 at the fourth follow-up position. The second storage station 7 is arranged for receiving the one bead-apex 9 from the weighing device 2 in a second storage plane P7. The weighing plane P2 is parallel or substantially parallel to the second storage plane P7. In the fifth transfer position X7, the weighing plane P2 is in line or substantially in line with the second storage plane P7.

Figure 9:
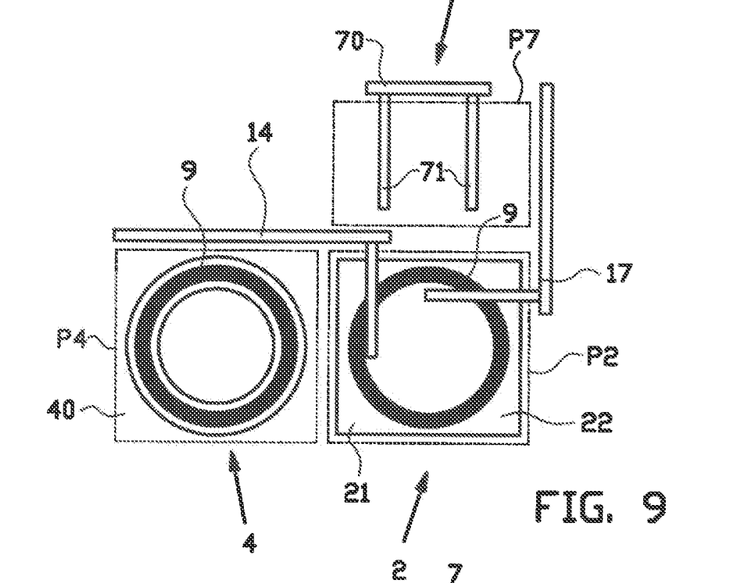
FIGS. 9 and 10 show top views at the level of the line IX-IX in FIG. 3 during exemplary steps of a method for processing bead-apexes.
Figure 10:
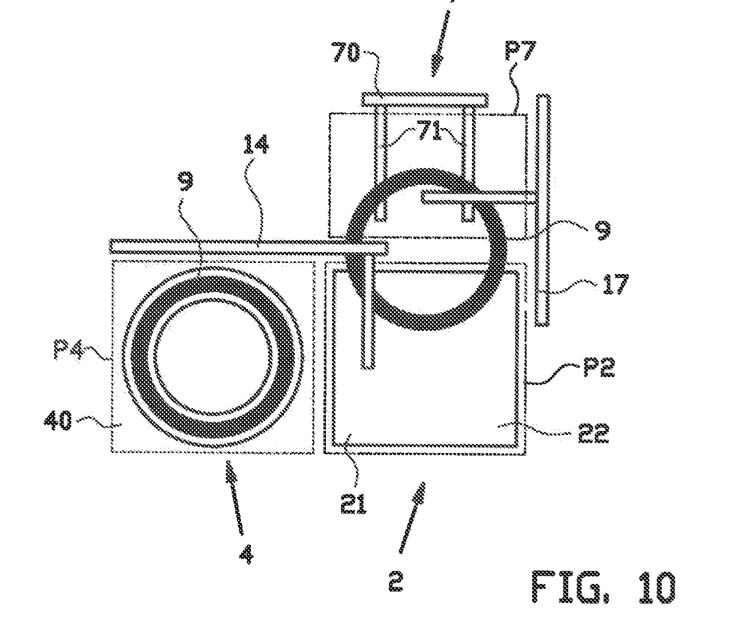

As can further be seen in FIGS. 3, 9 and 10, the second transport device 17 is arranged for transporting the one bead-apex 9 from the weighing position to the fourth follow-up position. The second transport device 17 is arranged for dragging or pulling the one bead-apex from the weighing position to the second storage member 7 in the fourth follow-up position in the second storage plane P7.

As can best be seen in FIG. 1, the assembly 1 further comprises a control unit 8 which is operationally connected to the weighing member 21 for receiving a signal indicative of the measured weight of the one bead-apex 9. The control unit 8 is arranged for controlling the movement of the one bead-apex 9 to one of the one or more follow-up stations 4, 5, 6, 7 based on the weight of the one bead-apex 9. Preferably, the control unit 8 is arranged for determining the follow-up station 4, 5, 6, 7 based on the weight of the bead-apex 9.

FIGS. 13 and 14A-D show a preferred assembly 101 for processing bead-apexes 9 which differs from the previously discussed assembly 1 in that the circumferential edge 24 of the weighing member 21 and the first storage station 6 are spaced apart by a mutual distance D1 smaller than the mutual distance D1 of the previous embodiment.

Figure 13:
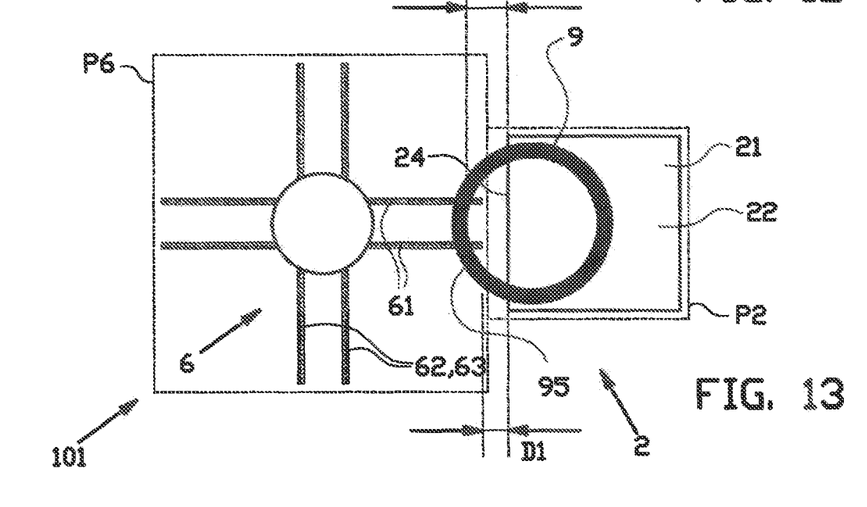
FIG. 13 shows the section view of FIGS. 11 and 12 according to a preferred embodiment of the of the invention.

The weighing surface 22 is arranged for partly or partially supporting the one bead-apex 9 in the weighing position. In particular, the weighing surface 22 is arranged for receiving and supporting the one bead-apex 9 in the weighing position such that a part 95 of the one bead-apex 9 protrudes from edge 24 of the weighing member 21 towards the first storage station 6. Preferably, the control unit 8 is arranged for controlling the first transport device 11 to place the one bead-apex 9 in the weighing position such that the part 95 of the one bead-apex 9 protrudes from the weighing surface 21 towards the first storage station 6.

Figure 14A:
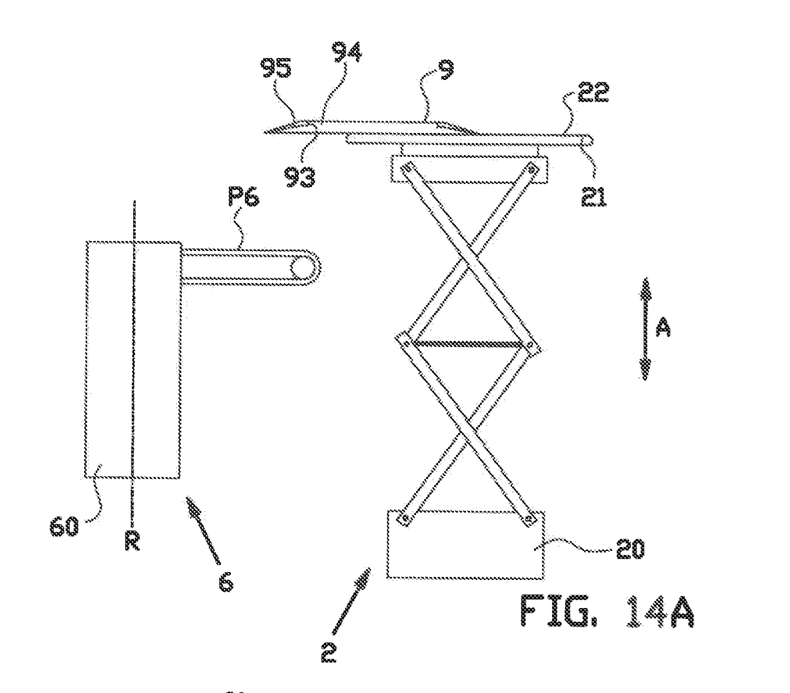
FIGS. 14A-D show a section view of the line XIV-XIV in FIG. 13 during exemplary steps of the method for processing bead-apex.

As is best shown in FIGS. 13 and 14A, the one bead-apex 9 is placed in the weighing position such that a part of the circular opening 94 of the bead-apex 9 is extending beyond the circumferential edge 24 of the weighing member. Preferably, at least fifty percent of the one bead-apex 9 is supported by the weighing surface 22 in the weighing position. The edge 24 of the weighing member 21 is facing the first storage station 6. The rim 93 of the bead 91 and the edge 24 of the weighing member 21 are facing each other at a gap distance D2. Alternatively, the first storage station 6 is arranged for pulling the protruding part 95 of the one bead-apex 9 towards the first storage station 6 and away from the weighing member 2 until the rim 93 of the bead 91 and the edge 24 of the weighing member 21 are facing each other at the gap distance D2. Preferably the gap distance D2 is larger than the mutual distance D1 between the edge 24 of the weighing member 21 and the first storage station 6, such that the rim 93 of the bead 91 may pivot on the first storage station 6.

Figure 14B:
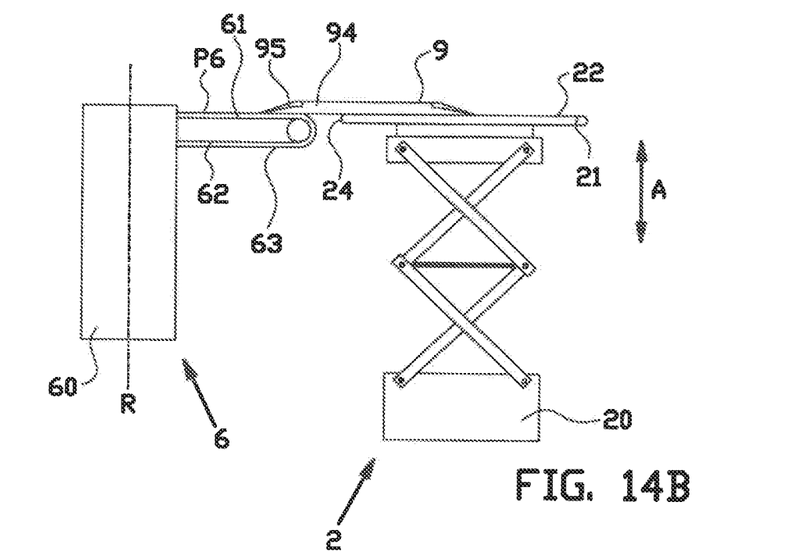

As is best shown in FIG. 14B, the weighing member 21 with the one bead-apex 9 thereon is movable in the alignment direction A into the fourth transfer position X6 in alignment with the third follow-up position. The first storage station 6 is arranged for engaging the protruding part 95 of the one bead-apex 9 from its respective position. Preferably, the first storage station 6 is arranged such that the first storage plane P6 is in line with or below the supply plane P3.

Figure 14C:
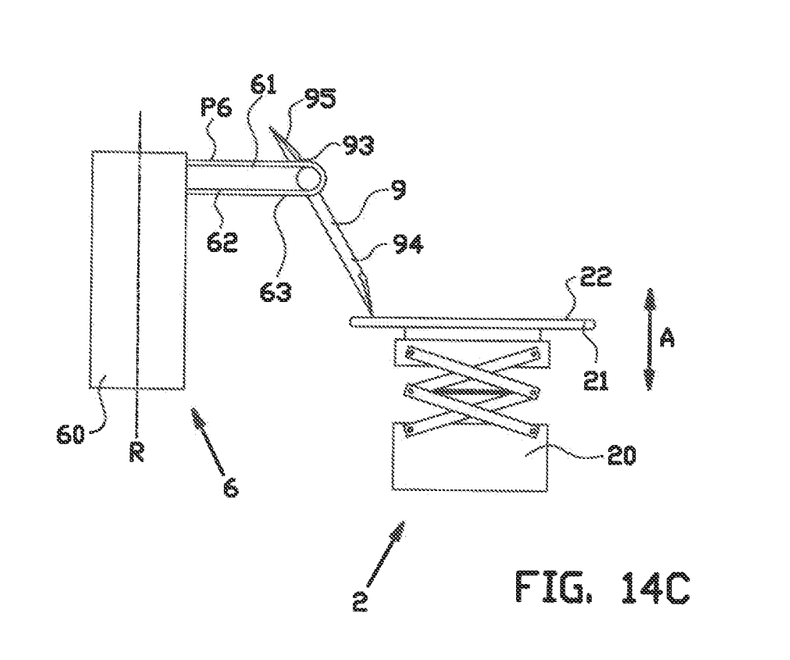

As is best shown in FIG. 14C, the weighing member 21 and the first storage station 6 are arranged for causing the bead-apex 9 to pivot around the rim 93 of the bead 91 when the weighing member 21 and the first storage station 6 are moved relative to each other in the alignment direction A and the rim 93 of the bead 91 is supported on the first storage station 6.

Figure 14D:
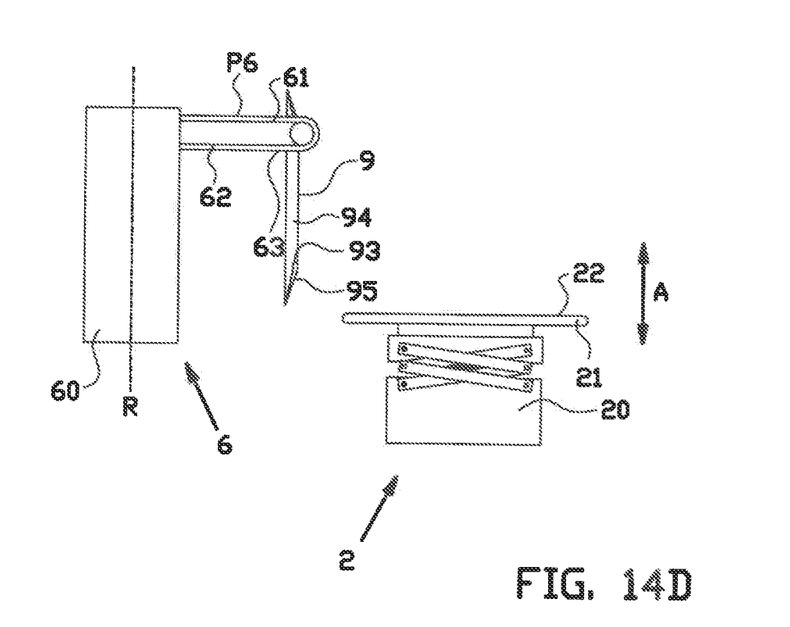

In this example, as shown in FIG. 14D, the weighing member 21 drops away from the one bead-apex 9, thereby allowing the one bead-apex 9 to pivot into the vertical orientation.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. An assembly for processing bead-apexes, wherein the assembly comprises a weighing device for measuring the weight of one of the bead-apexes, a supply station at a supply position for supplying the bead-apexes to the weighing device in a supply direction, and two or more follow-up stations at two or more follow-up positions for receiving the one bead-apex from the weighing device wherein the assembly further comprises a frame for supporting the supply station, wherein the weighing device comprises a weighing member with a weighing surface for receiving and supporting one of the bead-apexes in a horizontal weighing plane and a base member connected to and forming a base for the weighing member, wherein the weighing device is arranged for measuring the weight of the one bead-apex in a weighing position on the weighing member, wherein the supply station defines a supply plane parallel to the weighing plane, wherein the weighing plane is arranged to be in line with the supply plane when supplying the one bead-apex to the weighing device, wherein the weighing member is arranged for keeping the one bead-apex stationary during the weighing, wherein the assembly further comprises a control unit which is operationally connected to the weighing member for receiving a signal indicative of the measured weight of the one bead-apex, wherein the control unit is arranged for selectively controlling the movement of the one bead-apex to one of the two or more follow-up stations based on the weight of the one bead-apex, and wherein the weighing member is movable relative to the base member in an alignment direction from a first transfer position in alignment with the supply position into a second or further transfer positions in alignment with any one of the two or more follow-up positions.

2. The assembly according to claim 1, wherein the assembly further comprises a first transport device for transporting the one bead-apex from the supply station to the weighing device, wherein the control unit is arranged to control the transport device to transfer the one bead-apex from the weighing device to the one follow-up station.

3. The assembly according to claim 2, wherein the first transport device is arranged for picking and placing, dragging, pulling or pushing the one bead-apex from the supply position to the weighing position.

4. The assembly according to claim 2, wherein the first transport device is arranged for releasing the one bead-apex in the weighing position.

5. The assembly according to claim 1, wherein the two or more follow-up positions comprise a first follow-up position and wherein the two or more follow-up stations comprise a pile-up station at said first follow-up position, wherein the pile-up station comprises a pile-up member for receiving and stacking a plurality of the bead-apexes in a pile-up direction.

6. The assembly according to claim 5, wherein the pile-up station is arranged for receiving the one bead-apex from the weighing device in a pile-up plane, wherein the pile-up plane is parallel to the weighing plane.

7. The assembly according to claim 6, wherein the pile-up plane is arranged to be in line with the weighing plane when receiving the one bead-apex from the weighing device.

8. The assembly according to claim 1, wherein the two or more follow-up positions comprise a second follow-up position and wherein the two or more follow-up stations comprise a conveyance station at said second follow-up position, wherein the conveyance station comprises a transport conveyor for conveying the one bead-apex in a conveyance direction.

9. The assembly according to claim 8, wherein the conveyance station is arranged for receiving the one bead-apex from the weighing device in a conveyance plane, wherein the weighing plane is parallel to the conveyance plane.

10. The assembly according to claim 9, wherein the weighing plane is arranged to be in line with the conveyance plane when receiving the one bead-apex from the weighing device.

11. The assembly according to claim 1, wherein each bead-apex comprises a circular bead and a filler apex extending radially outward from said bead, wherein the bead has an inner rim extending in a bead-apex plane and forming a circular opening, wherein the two or more follow-up positions comprise a third follow-up position and wherein the two or more follow-up stations comprise a storage station at said third follow-up position, wherein the storage station comprises one or more storage members for storing one or more of the bead-apexes in a vertical orientation in which the one or more bead-apexes are supported with their respective rims on the one or more storage members and the bead-apex planes are vertical.

12. The assembly according to claim 11, wherein the storage station is arranged for receiving the one bead-apex from the weighing device in a storage plane, wherein the weighing plane is parallel to the storage plane.

13. The assembly according to claim 12, wherein the weighing plane is arranged to be in line with the storage plane when receiving the one bead-apex from the weighing device.

14. The assembly according to claim 11, wherein the storage station is a storage carousel comprising a central member which is rotatable about a central axis, wherein the one or more storage members comprise two or more storage arms extending radially from said central axis for storing the one or more of the bead-apexes in the vertical orientation.

15. The assembly according to claim 14, wherein each storage arm comprises a storage conveyor for conveying the bead-apexes stored thereon radially inward and radially outward along the respective storage member with respect to the central axis.

16. The assembly according to claim 1, wherein the weighing device comprises a weighing drive for driving the movement of the weighing member in the alignment direction.

17. The assembly according to claim 1, wherein the alignment direction is transverse, perpendicular to the weighing plane.

18. The assembly according to claim 17, wherein the one bead-apex comprises a circular bead and a filler apex extending radially outward from said bead, wherein the bead has an inner rim extending in a bead-apex plane and forming a circular opening, wherein the assembly comprises two or more follow-up stations at one or more follow-up positions for receiving the one bead-apex from the weighing device, wherein the weighing member has a circumferential edge facing one of the two or more follow-up stations, wherein the weighing surface is arranged for receiving and supporting the one bead-apex in the weighing position such that a part of the one bead-apex protrudes from the weighing surface towards the one follow-up station and a part of the circular opening of the one bead-apex is extending beyond the edge of the weighing member, wherein the rim of the bead at the part of the circular opening that extends beyond the edge and the edge of the weighing member are facing each other at a gap distance, wherein the one follow-up station is arranged for engaging the protruding part of the one bead-apex from its respective position, and wherein the weighing member and the one follow-up station are arranged for causing the one bead-apex to pivot around the rim of the bead when the weighing member and the one follow-up station are moved relative to each other in the alignment direction and the rim of the bead is supported on the one follow-up station.

19. The assembly according to claim 18, wherein the weighing member is arranged for dropping away from the one bead-apex, thereby allowing the one bead-apex that is supported on the one follow-up station to pivot about its rim into a vertical orientation in which the one bead-apex is supported with its rim on the one follow-up station and the bead-apex plane is vertical.

20. The assembly according to claim 18, wherein the assembly further comprises a first transport device and a control unit, wherein the control unit is arranged for controlling the first transport device to place the one bead-apex in the weighing position such that the part of the one bead-apex protrudes from the weighing surface towards the one follow-up station.

21. The assembly according to claim 1, wherein the weighing member is movable relative to the base member in the alignment direction from the first transfer position in alignment with the supply position into a second transfer position and a third transfer position in alignment with a first one of the two or more follow-up stations and a second one of the two or more follow-up stations, respectively.

22. The assembly according to claim 1, wherein the assembly further comprises one or more further transport devices for transporting the one bead-apex from the weighing position to one of the two or more follow-up positions.

23. The assembly according to claim 22, wherein the one or more further transport devices are arranged for picking and placing, dragging, pulling or pushing the one of the bead-apexes from the weighing position to the one of the two or more follow-up positions.

24. An assembly for processing a bead-apex, wherein the bead-apex comprises a circular bead and a filler apex extending radially outward from said bead, wherein the bead has an inner rim extending in a bead-apex plane and forming a circular opening, wherein the assembly comprises a weighing device for measuring the weight of one of the bead-apex and a follow-up station at a follow-up position for receiving the bead-apex from the weighing device, wherein the weighing device comprises a weighing member with a weighing surface for receiving and supporting the bead-apex in a horizontal weighing plane and a base member connected to and forming a base for the weighing member, wherein the weighing device is arranged for measuring the weight of the bead-apex in a weighing position on the weighing member, wherein the weighing member is arranged for keeping the bead-apex stationary during the weighing,
wherein the weighing member has a circumferential edge facing one of the one or more follow-up stations, wherein the weighing surface is arranged for receiving and supporting the bead-apex in the weighing position such that a part of the bead-apex protrudes from the weighing surface towards the follow-up station and a part of the circular opening of the bead-apex is extending beyond the edge of the weighing member, wherein the rim of the bead at the part of the circular opening that extends beyond the edge and the edge of the weighing member are facing each other at a gap distance, wherein the follow-up station is arranged for engaging the protruding part of the bead-apex from its respective position, wherein the weighing member is movable relative to the base member in an alignment direction transverse, perpendicular to the weighing plane into a respective transfer position in alignment with any one of the one or more follow-up positions, and wherein the weighing member and the follow-up station are arranged for causing the bead-apex to pivot around the rim of the bead when the weighing member and the follow-up station are moved relative to each other in the alignment direction and the rim of the bead is supported on the follow-up station.

25. The assembly according to claim 24, wherein the weighing member is arranged for dropping away from the bead-apex, thereby allowing the one bead-apex that is supported on the follow-up station to pivot about its rim into a vertical orientation in which the bead-apex is supported with its rim on the follow-up station and the bead-apex plane is vertical.

26. The assembly according to claim 24, wherein the assembly further comprises a first transport device and a control unit, wherein the control unit is arranged for controlling the first transport device to place the bead-apex in the weighing position such that the part of the bead-apex protrudes from the weighing surface towards the follow-up station.

* * * * *